United States Patent
Romero De La Osa et al.

(10) Patent No.: US 12,539,716 B2
(45) Date of Patent: Feb. 3, 2026

(54) AIRCRAFT TIRE CARCASS REINFORCEMENTS

(71) Applicant: COMPAGNIE GENERALE DES ETABLISSEMENTS MICHELIN, Clermont-Ferrand (FR)

(72) Inventors: Marc Romero De La Osa, Clermont-Ferrand (FR); Thierry Deux, Clermont-Ferrand (FR); Nizar Didane, Clermont-Ferrand (FR); Julie Gourdin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/706,657

(22) PCT Filed: Oct. 25, 2022

(86) PCT No.: PCT/FR2022/052021
§ 371 (c)(1),
(2) Date: May 1, 2024

(87) PCT Pub. No.: WO2023/079226
PCT Pub. Date: May 11, 2023

(65) Prior Publication Data
US 2025/0010664 A1    Jan. 9, 2025

(30) Foreign Application Priority Data

Nov. 4, 2021 (FR) ........................................ 2111701

(51) Int. Cl.
*B60C 9/00* (2006.01)
*B60C 9/04* (2006.01)
*B64C 25/34* (2006.01)

(52) U.S. Cl.
CPC .............. *B60C 9/0042* (2013.01); *B60C 9/04* (2013.01); *B64C 25/34* (2013.01);
(Continued)

(58) Field of Classification Search
CPC ......... B60C 9/04; B60C 9/005; B60C 9/0042; B60C 2009/0458; B60C 2009/0416;
(Continued)

(56) References Cited

U.S. PATENT DOCUMENTS 6,371,183 B1 * 4/2002 Ubukata ............... B60C 19/001
152/526
2004/0206439 A1 10/2004 Roget et al.
(Continued)

FOREIGN PATENT DOCUMENTS

| EP | 0609946 A1 * | 8/1994 | ............. D02G 3/447 |
|---|---|---|---|
| EP | 1381525 | 2/2006 | |
| EP | 2045379 | 4/2009 | |

*Primary Examiner* — Cedrick S Williams
(74) *Attorney, Agent, or Firm* — COZEN O'CONNOR

(57) ABSTRACT

An aircraft radial tire, having a radial carcass reinforcement with a plurality of carcass layers made up of textile reinforcing elements oriented substantially radially, which is to say making an angle of between 75° and 105° with the circumferential direction, the radial reinforcing elements of the carcass layers are composite cords having at least one aramid filament yarn and of which the rupture force is FR, measured in accordance with the standard D885/D885M-10A (2014) and these elements exhibit a deformation at least equal to 4.6% and at most equal to 6.5% for an applied force equal to FR/4. The tenacity of these reinforcing elements is at least equal to 80 daN/mm², and the linear density of the aramid filament yarn or yarns exceeds 210 tex.

7 Claims, 1 Drawing Sheet

(52) U.S. Cl.
CPC .............. *B60C 2009/0425* (2013.01); *B60C 2009/0475* (2013.01); *B60C 2200/02* (2013.01)

(58) Field of Classification Search
CPC ........ B60C 2009/0475; B60C 2200/02; D07B 1/062; D07B 1/0646
See application file for complete search history.

(56) References Cited

U.S. PATENT DOCUMENTS

| | | |
|---|---|---|
| 2007/0137754 A1 | 6/2007 | Westgate et al. |
| 2010/0024948 A1 | 2/2010 | Westgate et al. |
| 2012/0186218 A1 | 7/2012 | Westgate et al. |
| 2021/0025084 A1* | 1/2021 | Bosquet ................ B60C 9/0064 |

* cited by examiner

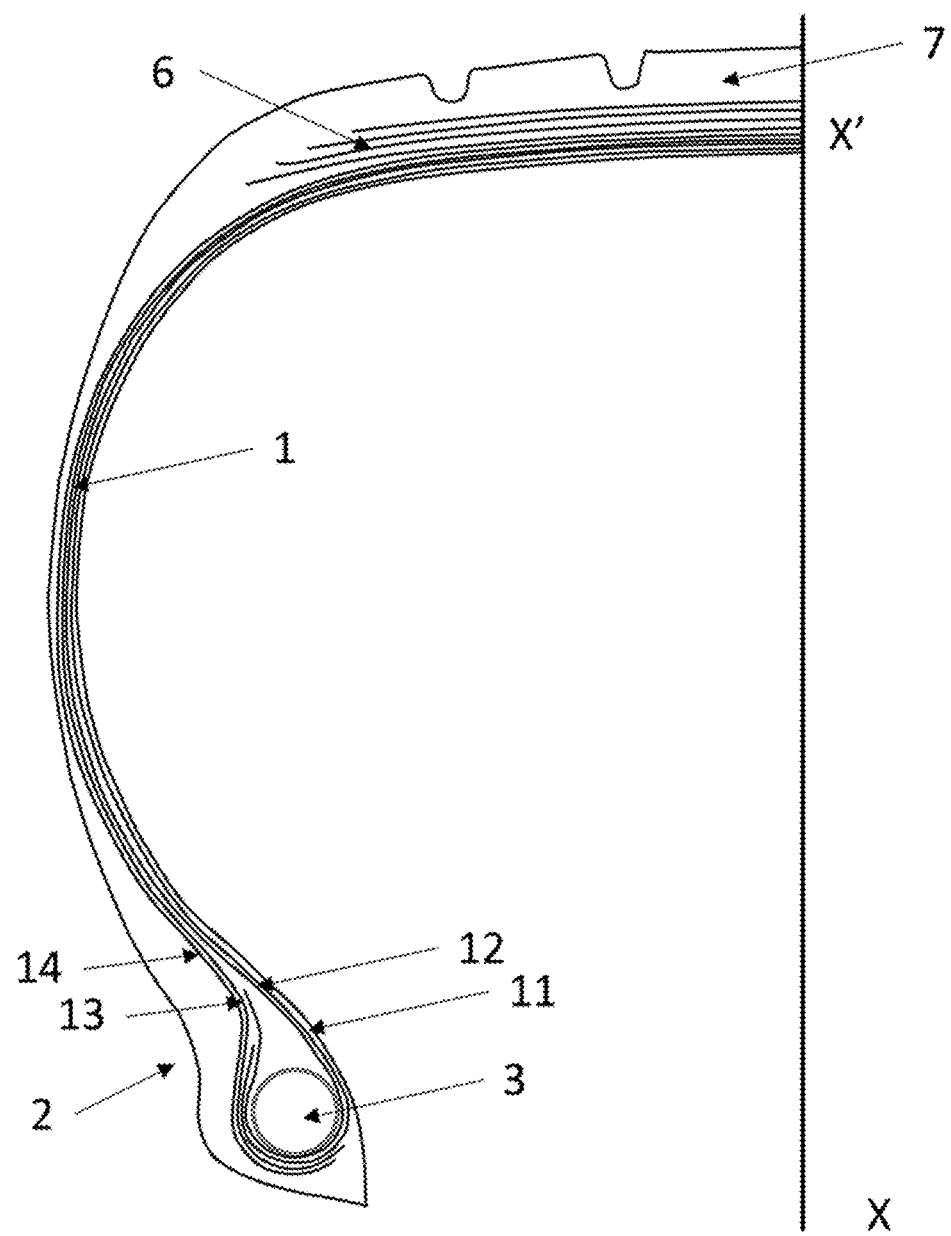

AIRCRAFT TIRE CARCASS REINFORCEMENTS

RELATED APPLICATIONS

This is a U.S. National Phase Application under 35 USC 371 of International Application PCT/FR2022/052021 filed on Oct. 25, 2022.

This application claims the priority of French application no. FR 2111701 filed Nov. 4, 2021, the entire content of all of which is hereby incorporated by reference.

FIELD OF THE INVENTION

The present invention relates to an aircraft tire with radial carcass reinforcement. Such tires are intended to bear heavy loads and to be inflated to relatively high pressures in excess of 10 bar.

BACKGROUND OF THE INVENTION

An aircraft tire according to the invention has a tread, a crown reinforcement and a radial carcass reinforcement, this radial carcass reinforcement comprising carcass layers comprising a plurality of textile reinforcing elements oriented substantially radially (which is to say making an angle of between 75° and 105° with the circumferential direction), this reinforcement being anchored to at least one circumferential reinforcement in each bead, and usually to one single circumferential reinforcement known as a bead wire. The reinforcing elements of said reinforcements are wound around the bead wire from the inside to the outside or vice versa, forming turn-ups, the respective ends of which are spaced apart radially from the axis of rotation of the tire. The harsh conditions in which aircraft tires are used are such that the endurance of the beads is poor, particularly at the carcass-reinforcement turn-ups.

However, the endurance of aircraft tire beads needs to be improved as said beads experience substantial overloads which may cause them to be compressed by the order of 50% of their height and more. Furthermore, the number of carcass layers, generally formed of reinforcing elements made of aliphatic polyamide or composites, namely formed of filament yarns with different modulus values that are needed in order to withstand the tension due to what is known as the proof pressure which, as is known, is to be equal to 4 times the service pressure. The significant number of said carcass layers obviously leads to a proliferation of reinforcing-element free ends, to a proliferation of interlayer interfaces, to greater hysteresis losses and therefore to higher operating temperatures, all of these being factors that tend to increase bead fatigue and limit bead endurance.

Solutions using composite cords have notably been set out in patent EP1381525, particularly composites formed of at least two filament yarns of high elastic modulus and of one single filament yarn of low elastic modulus, more specifically of two filament yarns made of aromatic polyamide or aramid, and of one filament yarn made of aliphatic polyamide (more specifically nylon).

However, the composites described in the prior art are not optimal, particularly as regards the two performance aspects essential to aircraft tires, namely endurance and mass. The inventors have set themselves the objective of improving these stated performance aspects.

SUMMARY OF THE INVENTION

This improvement is obtained through an aircraft radial tire, having a tread, a crown reinforcement and a radial carcass reinforcement, this radial carcass reinforcement comprising a plurality of carcass layers made up of textile reinforcing elements oriented substantially radially, which is to say making an angle of between 75° and 105° with the circumferential direction (XX'), this reinforcement being anchored to at least one circumferential reinforcement in each bead, the radial reinforcing elements of the carcass layers of the carcass reinforcement are composite cords comprising at least one aromatic polyamide filament yarn and of which the rupture force is FR, measured in accordance with the standard D885/D885M-10A (2014) and these elements exhibit a deformation at least equal to 4.6% and at most equal to 6.5% for an applied force equal to FR/4, the tenacity of the reinforcing elements of the carcass layers being at least equal to 80 daN/mm$^2$, the linear density of the aromatic polyamide filament yarn or yarns being at least equal to 210 tex.

Specifically, bead optimization astonishingly does not consist in looking for reinforcing elements that have good fatigue resistance and the highest possible rupture force for the lowest possible mass of reinforcement. Aside from the aspects of ability to withstand the pressure referred to as the proof pressure which is equal to 4 times the service pressure, research into the complex landing conditions to be observed or simulated have revealed that the deformation of the tires under these extreme conditions was practically identical, whatever the tenacity of the reinforcer. Under such conditions, it is beneficial to use reinforcing elements that are such that when the tire is compressed by more than 50%, each carcass layer remains in extension and therefore reinforcing elements that have high tenacity but also high deformation notably at the service pressure which is one quarter of the rupture pressure. Experience has demonstrated that in order to optimize tire performance, the deformation of the reinforcing elements of the carcass layers at the service pressure, namely at one quarter of the rupture force, needs to be at least equal to 4.6%. With this deformation under pressure, the reinforcing elements of the carcass layers do not become subjected to compression during landing. When a quarter of the rupture force is at least equal to 5%, preferably at least equal to 5.3%, the reinforcing elements of the carcass layers do not become subjected to compression during landings that are complicated by crosswinds which overload one side of the carcass architecture compared to the other. Moreover, because the elastic modulus values of the reinforcers are lower in this range of stress loadings compared to the cycles experienced by the carcass layers of tires according to the prior art, the tension cycles are lower and the fatigue resistance of the carcass layers increases. Moreover, in order to obtain a so-called proof pressure that is compliant with the service pressure for an acceptable mass, the reinforcing elements of the carcass layers need to have a tenacity at least equal to 80 daN/mm$^2$ and preferably at least equal to 88 daN/mm$^2$. Moreover, in order not to add weight to the tire by increasing the number of carcass layers, it is essential for the reinforcing elements of the carcass layers to comprise at least one aromatic polyamide filament yarn and for the linear density of the aromatic polyamide filament yarn or yarns to exceed 210 tex. For the same carcass reinforcement with hybrid cords (or composite cords) having an aromatic polyamide filament yarn of which the linear density of the aromatic polyamide filament yarn or yarns is below 180 tex, an aircraft tire inflated to a nominal pressure of 15 bar would need 8 to 9 carcass layers, which is prohibitive in terms of cost of manufacture. With the target hybrid cord constructions, aircraft tires inflated to a nominal pressure of 15 bar fewer than 6 carcass layers or even fewer than 5 carcass layers.

The filament yarns are made up of filaments. It will be recalled that, as is well known, a filament made of aromatic polyamide or aromatic copolyamide is a filament of linear macromolecules formed of aromatic groups held together by amide bonds, at least 85% of which are directly connected to two aromatic cores, and more particularly poly (p-phenylene terephthalamide) (or PPTA) fibres, which have been manufactured for a very long time from optically anisotropic spinning compositions. Among the aromatic polyamides or aromatic copolyamides, mention may be made of polyaryl amides (or PAA, particularly known by the Solvay company trade name Ixef), poly (metaxylylene adipamide), polyphthalamides (or PPA, particularly known by the Solvay company trade name Amodel), amorphous semi-aromatic polyamides (or PA 6-3T, particularly known by the Evonik company trade name Trogamid), meta-aramids (or poly (metaphenylene isophthalamide) or PA MPD-I, particularly known by the Du Pont de Nemours company trade name Nomex) or para-aramids (or poly (paraphenylene terephthalamide) or PA PPD-T, particularly known by the Du Pont de Nemours company trade name Kevlar or the Teijin company trade name Twaron).

A filament made of aliphatic polyamide is understood to be a filament of linear macromolecules of polymers or copolymers containing amide functions that do not have aromatic rings and can be synthesized by polycondensation between a carboxylic acid and an amine. Among the aliphatic polyamides, nylons PA4.6, PA6, PA6.6 or PA6.10, and in particular Zytel from the company DuPont, Technyl from the company Solvay or Rilsamid from the company Arkema may be mentioned.

The aircraft tire according to the invention is such that the radial reinforcing elements of the carcass layers of the carcass reinforcement are composite cords of which the rupture force is FR, measured in accordance with the standard D885/D885M-10A (2014) and these elements exhibit a deformation at most equal to 6.5% for an applied force equal to FR/4. Beyond such a value, the tire deforms excessively at nominal pressure. In order to limit bulk, it is therefore necessary to limit the width of the crown and therefore the volume of wearable rubber in the tire, which is not the logic of the invention.

Advantageously, the tenacity of the reinforcing elements of the carcass layers is at most equal to 120 daN/mm$^2$. A higher tenacity value would require a significant aromatic polyamide content and especially an aliphatic polyamide content that would not allow this aliphatic polyamide to perform its role of protecting the integrity of the cord notably in compression, which is a role that is essential for a reinforcer of the carcass layer.

Advantageously, the diameter of the aircraft tire according to the invention is at most equal to 1450 mm. This is because tires of larger diameter have service conditions that are such that the invention does not afford very significant improvements.

As a preference, the reinforcing elements of the carcass layers are composite cords made up of two aromatic polyamide filament yarns with a linear mass comprised between 240 and 260 g per km, and of one aliphatic polyamide filament yarn with a linear mass comprised between 200 and 220 g per km, with a twist comprised between 230 and 310 twists per metre, the reinforcing elements of the carcass reinforcement being distributed in carcass layers and arranged in said carcass layers at a pitch of between 1.0 mm and 1.3 mm.

Another variant according to the invention is an aircraft tire wherein the reinforcing elements of the carcass layers of the carcass reinforcement are composite cords made up of one aromatic polyamide filament yarn with a linear mass comprised between 320 and 340 g per km, and of one aliphatic polyamide filament yarn with a linear mass comprised between 130 and 220 g per km, with a twist comprised between 250 and 330 twists per metre, the reinforcing elements of the carcass reinforcement being arranged in said carcass layers at a pitch of between 0.9 mm and 1.2 mm.

Reinforced in this way with cords made up of filament yarns having different elastic modulus values at deformations that are low and lower than those exhibited in the prior art, leading to greater deformation at the service pressure, the layers of the carcass reinforcement are surprisingly better able to withstand the working cycles.

It is known that, in the case of an aircraft tire, the composite cords used in the tire according to the invention are formed from at least two filament yarns with high elastic modulus and of one single filament yarn with low elastic modulus, said cords offering the best compromise between the two properties that are the lightness of weight of the tire and the fatigue resistance of said cords. The three filament yarns above are individually overtwisted in an appropriate manner and then twisted together to form the reinforcing element. Nevertheless, experience has astonishingly shown that a tire according to the invention, wherein the reinforcing elements of the carcass layers are made up of a filament yarn of high elastic modulus but with a density at least equal to 210 tex and of a single filament yarn of low elastic modulus offers advantageous performance.

The layers of composite cords or hybrid cords which have been described hereinabove are obtained by coating these cords in a rubber compound referred to as a skim compound, the number of cords per centimetre of ply, measured perpendicular to the direction of said cords, being calculated in order to obtain the necessary tensile strength.

BRIEF DESCRIPTION OF THE DRAWINGS

The features of the invention are illustrated in FIG. 1, which is schematic and not to scale, and depicts a meridian half-section through the tire according to the invention.

DETAILED DESCRIPTION OF THE DRAWINGS

The invention was tested on a tire of standardized size 1400×530 R 23. The carcass reinforcement 1 is made up of four radial textile cord layers (11, 12, 13, 14). In an aircraft tire, radial cords should be understood to mean cords or reinforcing elements that make, with the circumferential direction, angles that may be comprised in the interval 90°+15°. The four layers are wound in each bead (2) about a bead wire (3), two of them being wound in such a way that their ends are radially on the inside of the bead wires, and the other two such that their ends are radially on the outside of the bead wire, this being so in each bead wire. A tread 7, outer protective layers of the crown 6, supplement the construction of the tire under study, in the known way.

The tire according to the invention is compared against a control tire as described in EP1381525.

For the control tire, the four carcass reinforcing layers of the aircraft tire under study are formed of composite cords made up of two aromatic polyamide filament yarns, each filament yarn having a count of 330 tex, individually overtwisted with an S-twist of 250 twists/metre, and of one aliphatic polyamide (more specifically nylon) filament yarn having a count of 188 tex, said filament yarn being individually overtwisted with an S-twist of 250 twists/metre. The three filament yarns that are already twisted on themselves are then twisted together with a Z-twist of 270 twists/metre to form the cord ready for use in layers. In this instance, the cord used has as tenacity substantially equal to 128 daN/mm$^2$, and a deformation of around 4.2% at FR/4. The reinforcing elements are distributed in each carcass layer with a pitch equal to 1.25 mm.

The invention is tested with two types of composite cords. For the first tire according to the invention, I1, the composites are made up of two aromatic polyamide filament yarns, each filament yarn having a count of 250 tex, individually overtwisted with an S-twist of 270 twists/metre, and of one aliphatic polyamide (more specifically nylon) filament yarn having a count of 210 tex, said filament yarn being individually overtwisted with an S-twist of 270 twists/metre. The three filament yarns that are already twisted on themselves are then twisted together with a Z-twist of 270 twists/metre to form the cord ready for use in layers. In this instance, the cord used has as tenacity substantially equal to 112 daN/mm$^2$, and a deformation of around 5.4% at FR/4. This embodiment was numerically simulated and then manufactured in order to be tested using the type-approval test procedures in force. The reinforcing elements are distributed in each carcass layer with a pitch equal to 1.0 mm.

For the second tire according to the invention, I2, the composites are made up of one aromatic polyamide filament yarn, each filament yarn having a count of 330 tex, individually overtwisted with an S-twist of 290 twists/metre, and of one aliphatic polyamide (more specifically nylon) filament yarn having a count of 210 tex, said filament yarn being individually overtwisted with an S-twist of 290 twists/metre. The two filament yarns that are already twisted on themselves are then twisted together with a Z-twist of 290 twists/metre to form the cord ready for use in layers. In this instance, the cord used has as tenacity substantially equal to 92 daN/mm$^2$, and a deformation of around 5.4% at FR/4. This tire was numerically simulated. The reinforcing elements are distributed in each carcass layer with a pitch equal to 1.0 mm.

In the instances presented, the four carcass layers use the same cord at the same pitch, the same thicknesses and the same formulations of rubber compounds, although this is not a requisite of the invention, it being possible for the density thickness and nature of the compound to differ according to the layers as required.

In the control tire and the tires according to the invention, the rubber compounds that coat the composite cords of the carcass layers are identical. The same is true of the crown layers and the tread.

Moreover, a tire I1 as described above was tested, with successful outcome, in accordance with standard TSO C62e which notably tests tire endurance. Compared to the control tire of the same size, the lightening of the tire 1 according to the invention is by 0.8 kg, namely 10% of the mass of the carcass layers, thereby demonstrating the astonishing benefit of these cords that enable the mass of the tire casings to be reduced by reducing the tenacity of the carcass reinforcers.

The tire according to the embodiment I1 was also tested on a metal rolling road of diameter 3 m at a speed corresponding to a taxiing speed of 40 km/h with a deflection equal to 1.2 times the nominal deflection defined in the aircraft tire standard (Aircraft Year Book 2013 published by Tire and Rim association). During the test, the tire was regularly stopped in order not to introduce thermal degradation into the crown according to predetermined cycles. In total, the control tire and the tire according to the invention I1 covered 3800 km with no apparent damage to the carcass plies. Carcass-layer reinforcers from the two tires were then extracted and their post-testing residual rupture forces measured. For the control tire, the drop-off in rupture force as a result of the compression was 15%. For the tire I1 according to the invention, the drop-off in rupture force was 7%. This demonstrates that the running potential according to the invention is improved in comparison with the control tire, thus demonstrating the benefit of the invention.

The invention according to the embodiment I2 was estimated by calculation. It satisfies the same design criteria as the tire according to I1. According to these criteria, testing it in accordance with standard TSO C62e, which notably tests the endurance of the tire, should have a successful outcome compared with the control tire of the same size, according to the simulation tools, the tire according to the invention I2 having the same mass as the control tire. However, significant performance improvements in terms of the drop-off in rupture force (<7%) were attained.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An aircraft radial tire, having a tread, a crown reinforcement, and a radial carcass reinforcement,
   a. the radial carcass reinforcement comprising a plurality of carcass layers made up of textile reinforcing elements oriented substantially radially, which is to say making an angle of between 75° and 105° with a circumferential direction (XX'), the reinforcement being anchored to at least one circumferential reinforcement in each bead,
   b. wherein the radial reinforcing elements of the carcass layers of the carcass reinforcement are composite cords comprising at least one aromatic polyamide filament yarn and of which a rupture force is FR, measured in accordance with the standard D885/D885M-10A (2014) and the radial reinforcing elements exhibit a deformation at least equal to 4.6% and at most equal to 6.5% for an applied force equal to FR/4,
   c. a tenacity of the radial reinforcing elements of the carcass layers is at least equal to 80 daN/mm$^2$, and
      a linear density of the at least one aromatic polyamide filament yarn is between 210 tex and 250 tex
      the carcass reinforcement being arranged in said carcass layers at a pitch of between one of:
         0.9 mm and 1.2 mm and
         1.0 mm and 1.3 mm.

2. The aircraft tire according to claim 1, wherein the radial reinforcing elements of the carcass layers of the carcass reinforcement exhibit a deformation at least equal to 5% for an applied force equal to FR/4.

3. The aircraft tire according to claim 1, wherein the tenacity of the radial reinforcing elements of the carcass layers of the carcass reinforcement is at least equal to 88 daN/mm$^2$.

4. The aircraft tire according to claim 1, wherein the tenacity of the radial reinforcing elements of the carcass layers of the carcass reinforcement is at most equal to 120 daN/mm$^2$.

5. The aircraft tire according to claim 1, wherein a diameter of the tire is at most equal to 1450 mm.

6. The aircraft tire according to claim 1, wherein the radial reinforcing elements of the carcass layers are composite cords made up of two aromatic polyamide filament yarns with a linear mass comprised between 240 and 260 g per km, and of one aliphatic polyamide filament yarn with a linear mass comprised between 200 and 220 g per km, with a twist comprised between 230 and 310 twists per metre, the radial reinforcing elements being distributed in each carcass layer at the pitch of between 1.0 mm and 1.3 mm.

7. The aircraft tire according to claim 1, wherein the radial reinforcing elements of the carcass layers of the carcass reinforcement are composite cords made up of one aromatic polyamide filament yarn with a linear mass comprised between 320 and 340 g per km, and of one aliphatic polyamide filament yarn with a linear mass comprised between 130 and 220 g per km, with a twist comprised between 250 and 330 twists per metre, the radial reinforcing elements of the carcass layers of the carcass reinforcement being arranged in said carcass layers at the pitch of between 0.9 mm and 1.2 mm.

\* \* \* \* \*